(12) United States Patent
Yoakum et al.

(10) Patent No.: US 8,160,079 B1
(45) Date of Patent: Apr. 17, 2012

(54) LOCAL COMMUNICATION AGENT

(75) Inventors: John H. Yoakum, Cary, NC (US); R. Alberto Villarica, Dallas, TX (US)

(73) Assignee: Avaya Inc., Basking Ridge, NJ (US)

( * ) Notice: Subject to any disclaimer, the term of this patent is extended or adjusted under 35 U.S.C. 154(b) by 1909 days.

(21) Appl. No.: 10/385,348

(22) Filed: Mar. 10, 2003

(51) Int. Cl.
*H04L 12/56* (2006.01)
*H04L 12/66* (2006.01)
*G06F 15/16* (2006.01)
*G06F 15/173* (2006.01)

(52) U.S. Cl. ........ 370/401; 370/465; 709/202; 709/203; 709/223; 709/227

(58) Field of Classification Search ................. 370/401, 370/465; 709/202, 203, 223, 227
See application file for complete search history.

(56) References Cited

U.S. PATENT DOCUMENTS

| | | | | |
|---|---|---|---|---|
| 5,793,762 A * | 8/1998 | Penners et al. | ............... | 370/389 |
| 6,195,705 B1 * | 2/2001 | Leung | ............... | 709/245 |
| 6,407,988 B1 * | 6/2002 | Agraharam et al. | ......... | 370/328 |
| 6,546,419 B1 * | 4/2003 | Humpleman et al. | ....... | 709/223 |
| 6,721,297 B2 * | 4/2004 | Korus et al. | .................. | 370/338 |
| 6,785,374 B2 * | 8/2004 | Wang et al. | ................... | 379/219 |
| 6,788,676 B2 * | 9/2004 | Partanen et al. | ............. | 370/352 |
| 6,853,637 B1 * | 2/2005 | Norrell et al. | ................ | 370/352 |
| 6,856,624 B2 * | 2/2005 | Magret | ........................ | 370/392 |
| 6,915,325 B1 * | 7/2005 | Lee et al. | ..................... | 709/202 |
| 6,915,345 B1 * | 7/2005 | Tummala et al. | ............ | 709/225 |
| 6,941,378 B2 * | 9/2005 | Apostolopoulos et al. | ... | 709/231 |
| 6,954,790 B2 * | 10/2005 | Forslow | ........................ | 709/227 |
| 6,973,309 B1 * | 12/2005 | Rygula et al. | ................ | 455/436 |
| 7,020,465 B2 * | 3/2006 | O'Neill | ..................... | 455/432.1 |
| 7,042,864 B1 * | 5/2006 | Leung et al. | .................. | 370/338 |
| 7,079,520 B2 * | 7/2006 | Feige et al. | .................... | 370/338 |
| 7,080,151 B1 * | 7/2006 | Borella et al. | ................ | 709/230 |
| 7,136,362 B2 * | 11/2006 | Chen | ............................. | 370/328 |
| 7,146,410 B1 * | 12/2006 | Akman | ......................... | 709/220 |
| 7,155,518 B2 * | 12/2006 | Forslow | ........................ | 709/227 |
| 7,212,505 B2 * | 5/2007 | Saint-Hilaire et al. | ........ | 370/328 |
| 7,224,695 B2 * | 5/2007 | Ono et al. | ..................... | 370/401 |
| 7,269,173 B2 * | 9/2007 | Iyer et al. | ................. | 370/395.31 |
| 7,275,262 B1 * | 9/2007 | Habert | ............................ | 726/26 |
| 7,324,492 B2 * | 1/2008 | Leung et al. | .................. | 370/338 |
| 7,509,123 B2 * | 3/2009 | O'Neill | ...................... | 455/432.1 |
| 2001/0014907 A1 * | 8/2001 | Brebner | ........................ | 709/202 |
| 2002/0087393 A1 * | 7/2002 | Philonenko | ..................... | 705/11 |
| 2002/0133598 A1 * | 9/2002 | Strahm et al. | ................ | 709/228 |
| 2003/0084128 A1 * | 5/2003 | Anderson et al. | ............ | 709/220 |
| 2003/0135587 A1 * | 7/2003 | Fisher et al. | .................. | 709/219 |
| 2003/0135616 A1 * | 7/2003 | Carrico et al. | ................ | 709/225 |
| 2003/0217136 A1 * | 11/2003 | Cho et al. | ...................... | 709/223 |
| 2004/0078600 A1 * | 4/2004 | Nilsen et al. | .................. | 713/201 |
| 2006/0010250 A1 * | 1/2006 | Eisl et al. | ...................... | 709/245 |

* cited by examiner

*Primary Examiner* — Alpus H Hsu

(74) *Attorney, Agent, or Firm* — Withrow & Terranova, PLLC

(57) ABSTRACT

The present invention provides a local agent operating in association with a communication client. The local agent acts on behalf of the communication client to enable capabilities the communication client is not capable of providing, by serving as a liaison between the communication client and the remainder of the communication network. By enabling additional capabilities and functionality, the local agent makes the communication client compatible with other communication clients and intermediate devices and systems through which communications are established. The local agent may process both messages and media streams to ensure compatibility, as well as facilitate interaction with other applications or a user to gather information sufficient to respond to requests from the other communication devices and systems.

42 Claims, 3 Drawing Sheets

LOCAL COMMUNICATION AGENT

FIELD OF THE INVENTION

The present invention relates to packet-switched communications, and in particular, to providing an associated local communication agent for a given communication client to enhance the ability of the communication client to communicate with other clients or through intermediate systems or devices.

BACKGROUND OF THE INVENTION

As with any emerging technology, disparate implementations naturally occur, even when innovators attempt to follow defined standards. In the case of communication technology, success is highly dependent on the ability of a very large percentage of potential users to interact with each other. The traditional telephony network is a perfect example. Due to a set of global compatible network interface standards, and the inherent nature of the network implementation, the vast majority of telephony users can communicate with each other. However, individual communication clients that work on one system may or may not work directly on other systems. This is true for both wireline and wireless systems. Some of the unique characteristics for communication clients include physical interfaces, electrical interfaces, and radio interfaces, as well as respective protocols. A problem of enabling the interworking of these disparate communication clients is generally solved by interworking at the network level between systems, and not between the communication clients themselves. Such interworking is facilitated by the circuit-centric nature of the traditional telephony network, where clients are directly attached to their supporting systems, and each system only needs to interact with peer systems, not directly with the individual clients of other systems.

For Internet-based and related Internet Protocol (IP)-centric networks, the basic nature of the network is one where any single communication client can potentially interact directly with other individual communication clients. To complicate matters, for the sake of privacy and the prevention of intrusive or otherwise disruptive forces, additional network elements such as firewalls and network address translation devices impede the ability of communication clients to interact with one another and with other systems. Internet communications protocol standards are evolving to help maximize interoperability between a vast number of communication clients. Unfortunately, using standardized protocols will never fully address interoperability issues required by special and emerging functionalities. Further, the protocol standards tend to lag behind initial implementations of new and emerging functionality and technology. The result is an Internet architecture where many communication clients can interact with one another for a given set of basic functionalities, but cannot interoperate to effect unique, new, or emerging functionalities. Since typically only the creator of a specific communication client can modify that client, the end result is a proliferation of unique communication clients, which support only limited interoperability with many other communication clients.

Since it is generally commercially unfeasible to customize individual communication clients as well as engineer such flexibility in a cost-effective manner for widespread communication applications, there is a need for a technology capable of supplementing communication clients to increase or otherwise enhance interoperability with similar, yet disparate, communication clients. This technology should effectively extend the capabilities of associated communication clients to allow them to provide desirable features and support features necessary to interwork with other communication clients, as well as assist in navigating intermediate systems, and network devices such as firewalls and network address translation devices.

SUMMARY OF THE INVENTION

The present invention provides a local agent operating in association with a communication client. The local agent acts on behalf of the communication client to enable capabilities the communication client is not capable of providing, by serving as a liaison between the communication client and the remainder of the communication network. By enabling additional capabilities and functionality, the local agent makes the communication client compatible with other communication clients and intermediate devices and systems through which communications are established. The local agent may process both messages and media streams to ensure compatibility, as well as facilitate interaction with other applications or a user to gather information sufficient to respond to requests from the other communication devices and systems. Message processing may include readdressing and reformatting messages, while media processing may include buffering, recompression, and re-encoding or decoding to enhance the robustness of the media stream as well as ensure compatibility between the communication client, other communication clients, and any intermediate systems involved. The additional information retrieved from other applications or the user may be used for authentication or other purposes requiring additional information the communication client is incapable of gathering.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The present invention provides a local agent in association with a communication client, wherein the local agent extends the capabilities of the communication client to communicate with other clients or through intermediate systems or devices. The local agent can process messages and media streams between the communication client and other systems or devices to facilitate interoperability therebetween. Message processing may include analyzing and reformatting incoming and outgoing messages, as well as modifying addressing therein to ensure that messages are properly delivered and formatted as expected by the receiving entity. The local agent may independently respond to and generate messages on behalf of the communications client, interacting with its own user interface or other applications as desired. The local agent may process media streams, such as streaming audio and video, to minimize delays, losses, and jitter. Those skilled in the art will recognize that streaming media includes media generated in real-time, such as voice or video intended to be part of an interactive conversation, as well as previously stored media such as entertainment and other media. For example, the local agent may convert among various coding and decoding techniques (CODECs), change compression techniques, as well as provide characterization, conditioning, reconstruction, error concealment, and buffering of the incoming or outgoing media. The media processing is preferably implemented with knowledge of any intermediate systems involved in the packet path to ensure a clean and reliable transfer. Preferably, the communication client is essentially unaware of the local agent, which acts as a proxy therefor and is preferably integrated within the device facilitating the communication client or operates directly with that device.

Figure 1:
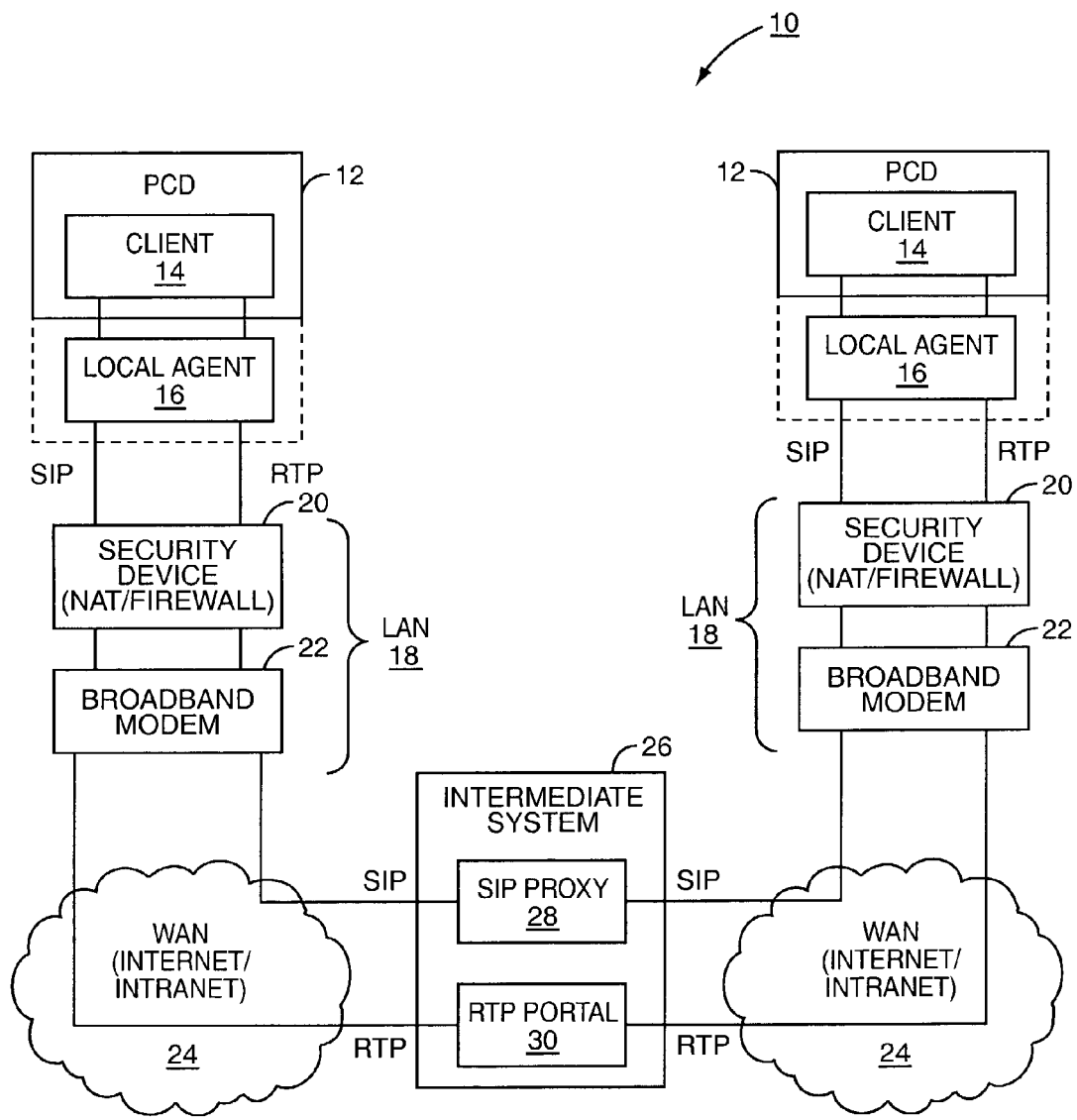
FIG. 1 illustrates a communication environment according to one embodiment of the present invention.

Turning now to FIG. 1, a communication environment 10 is illustrated including multiple personal communication devices (PCDs) 12, which are essentially any type of computing device capable of facilitating communications over a packet-switched network. In general, each PCD 12 will have a client 14, which is an application capable of establishing communications with other clients and systems. Importantly for the present invention, a local agent 16 is provided in close association with the client 14, either in the PCD 12 or in a system closely associated with the PCD 12. As noted, the local agent 16 acts as a liaison between the client 14 and the devices with which the client 14 communicates in an effort to facilitate interoperability, and in particular, make up for any incompatibilities or provide features that the client 14 lacks.

Generally, the PCD 12 is attached to a local area network (LAN) 18, which communicates with other systems and devices that are not located on the LAN 18 via some sort of security device 20 and potentially a broadband access device such as a modem 22. Those skilled in the art will recognize that the LAN 18 is representative of any wired or wireless packet access technology, many of the components of which are not illustrated here for simplicity but are obvious in specific packet network configurations. For the sake of example, the security device 20 may be a network address translator (NAT), firewall, or combination thereof. Those skilled in the art will recognize the functionality of a NAT and the various techniques for implementing firewalls, and as such, details of this operation are not provided herein. However, those skilled in the art will recognize that special requirements are often placed on devices that communicate through such security devices 20. For example, firewalls often require periodic updates or messages to maintain a port or pathway through the firewall, especially when there may be a significant time delay between messages sent between the communicating devices.

Typically, the LAN 18 is coupled to a wide area network (WAN) 24, such as the Internet or other intranet, through the security device 20 and the associated broadband modem 22. In certain situations, the WAN 24 will lead to a LAN 18 of a corresponding client 14 for a communication session. In other situations, some form of intermediate system 26 is used to facilitate communications between the clients 14 or to provide further processing and functionality. In the illustrated embodiment, communication sessions between the clients 14 are established using the Session Initiation Protocol (SIP) and the actual media sessions include streaming media sessions using the Real Time Protocol (RTP). Those skilled in the art will recognize various messaging and media protocols, as well as recognizing that SIP and RTP appear to be the predominant protocols and are believed to be the best way to implement the concepts of the present invention.

In general, a SIP proxy 28 may facilitate media sessions between any number of endpoints, which represent the devices communicating with each other. These endpoints may support any one or combination of data, audio, and voice media sessions, depending on the configuration of the respective endpoints. In addition to traditional SIP endpoints, endpoints for the present invention may take the form of the client 14, and the like.

A SIP endpoint is generally capable of running an application, which is generally referred to as a user agent (UA), and is capable of facilitating media sessions coordinated by SIP. User agents register their ability to establish sessions with a SIP proxy 28 by sending REGISTER messages to the SIP proxy 28. The REGISTER message informs the SIP proxy 28 of the SIP universal resource locator (URL) that identifies the user agent to the SIP network. The REGISTER message also contains information about how to reach specific user agents over the SIP network, by providing the Internet Protocol (IP) address and port that the user agent will use for SIP sessions. A SUBSCRIBE message may be used to subscribe to an application or service provided by a SIP endpoint. Further, NOTIFY messages may be used to provide information between SIP endpoints in response to various actions or messages, including REGISTER and SUBSCRIBE messages.

When a user agent wants to establish a session with another user agent, the user agent initiating the session will send an INVITE message to the SIP proxy 28 and specify the targeted user in the TO header of the INVITE message. Identification of the user takes the form of a SIP URL. In its simplest form, the URL is represented by "<username>@<domain>," such as "janedoe@nortelnetworks.com." The SIP proxy 28 will use the SIP URL in the TO header of the message to determine if the targeted user has a registered user agent with the SIP proxy 28. Generally, the user name is unique within the name space of the specified domain.

If one or more user agents associated with the targeted user uniform resource locator (URL) has registered with the SIP proxy 28, the SIP proxy 28 will forward the INVITE message directly to the registered targeted user agent(s). Once a targeted user agent responds with a 200 OK message, and a session between the respective user agents will be established as per the message exchange required in the SIP specification. Media capabilities are passed between the two user agents of the respective endpoints as parameters embedded within the session setup messages, such as the INVITE, 200 OK, and acknowledgement (ACK) messages. The media capabilities are typically described using the Session Description Protocol (SDP). Once respective endpoints are in an active session with each other and have determined each other's capabilities, the specified media content may be exchanged during an appropriate media session.

An exemplary intermediate system 26 may include the above-mentioned SIP proxy 28 for facilitating messaging between the respective clients 14, as well as provide an RTP portal 30 facilitating streaming audio or video back and forth between the clients 14. In such an embodiment, the local agent 16 associated with the corresponding clients 14 will effectively process the various messages and media streams therebetween as necessary to ensure compatibility between the clients 14 as well as between each client 14 and the intermediate system 26. Providing the local agent 16 allows the clients 14 to assume a more generic form, while placing the burden of ensuring compatibility between the clients 14 and the security devices 20, intermediate systems 26, and other clients 14 on the local agent 16. As such, the clients 14 can effectively communicate with other clients 14 without reconfiguration or accommodating for environments where compatibility is an issue and direct point-to-point communications are not feasible.

Preferably, the local agent 16 is deployed at the user's edge of an Internet Protocol-based network, such as the LAN 18, and immediately prior to the communication client 14. The local agent 16 may analyze and process messages, such as SIP messages, to ensure compatibility and maintain proper addressing given the security devices 20 that are in place. Such processing may include reformatting, readdressing, and protocol conversion to ensure compatibility and relieve any obligation for reconfiguring the client 14. The local agent 16 may process the streaming media to ensure CODEC compatibility, provide characterization, conditioning, reconstruction, error concealment, and buffering, or change compression techniques or degrees to accommodate system or client deficiencies. Additionally, certain features or functions available at the remote client 14 may not be available at the local client 14. As such, the local agent 16 is preferably configured to interact with the PCD 12 in a manner sufficient to be compatible with the additional features at the remote client 14. The local agent 16 can access other applications running on the PCD 12 to obtain information or provide additional processing in a manner sufficient to allow the PCD 12 to respond in a proper fashion to the remote client 14. Further, the local agent 16 may cooperate with the PCD 12 to interact with the user to obtain information, such as passwords or other authentication indicia, or other information necessary to comply with communication requirements posed by the remote client 14, intermediate system 26, or security device 20.

For example, if the client 14 is the communication client in Microsoft's Windows Messenger application, and the intermediate system 26 would otherwise be incompatible for Windows Messenger clients, the respective local agents 16 running in cooperation with the Windows Messenger clients will facilitate interoperability between the Windows Messenger clients, security devices 20, and the intermediate system 26.

Figure 2:
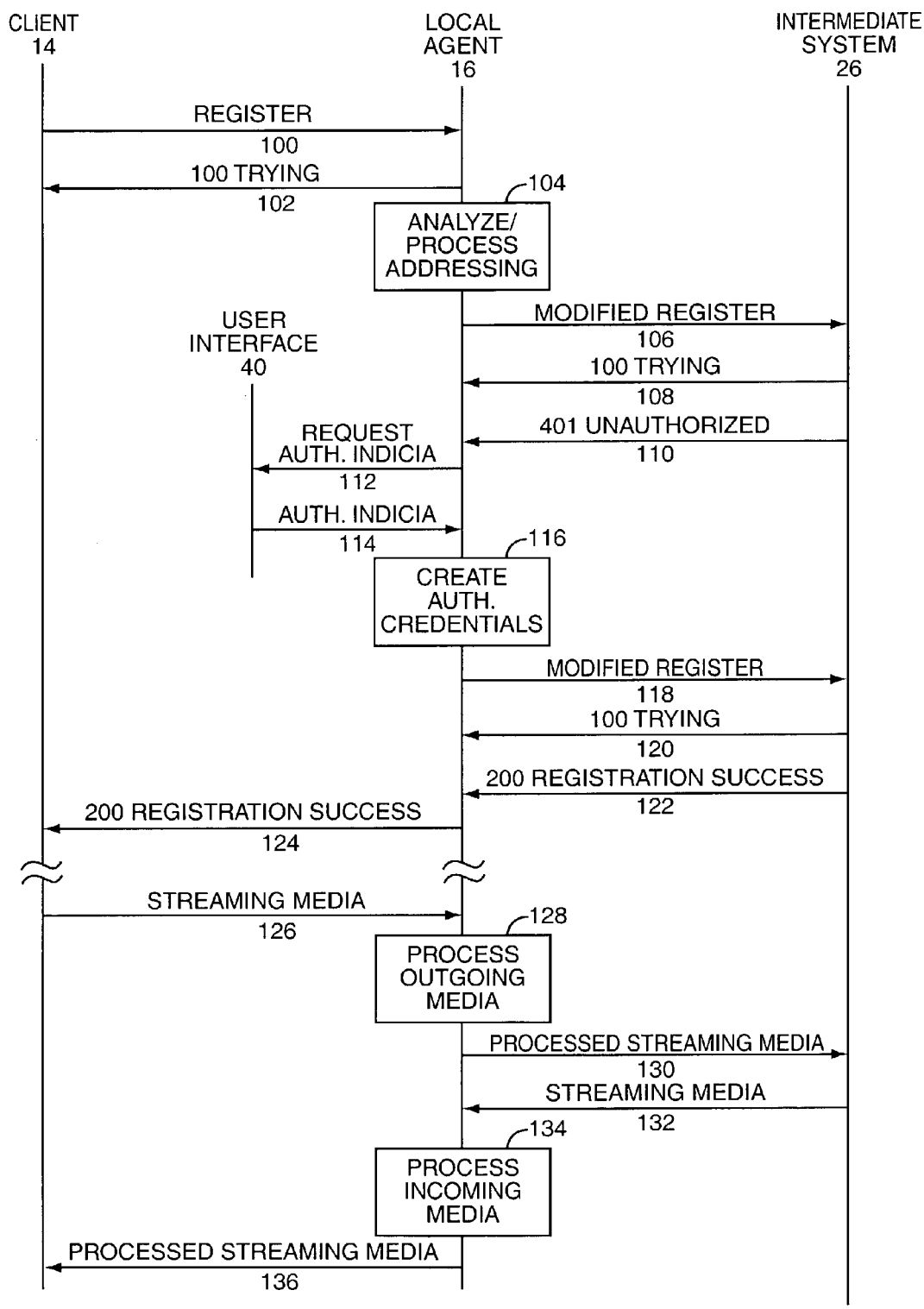
FIG. 2 is a communication flow diagram illustrating operation of the invention according to one embodiment.

To help illustrate the concepts of the present invention, the communication flow diagram of FIG. 2 provides an exemplary scenario wherein the local agent 16 operates to make up for incompatibilities between the client 14 and the intermediate system 26. In this scenario, the client 14 attempts to register with the intermediate system 26, yet the client 14 does not provide for authentication, which is required by the intermediate system 26. In this situation, the local agent 16 takes over and obtains the proper authentication indicia, such as a password and user identification, from the user and provides it to the intermediate system 26 on behalf of and unbeknownst to the client 14. In this scenario, the local agent 16 takes on localhost capability with respect to the PCD 12, such that messages to and from the client 14 are automatically addressed and readdressed by the local agent 16.

Initially, the client 14 attempts to register with the intermediate system 26 by sending a Register message, which is intended for the intermediate system 26, but due to the localhost configuration, the Register message is addressed to the local agent 16 (step 100). In traditional SIP form, the local agent 16 will respond by sending a 100 Trying message to the client 14 (step 102). The local agent 16 will analyze and process the original Register message and change the addressing to form a Modified Register message (step 104), which is then sent to the intermediate system 26 on behalf of the client 14 (step 106). The intermediate system 26 will immediately send back a 100 Trying message to the local agent 16 (step 108) indicating that the Register request is being processed. Assume that in response to any initial Register message, the intermediate system 26 is configured to challenge authorization by sending a 401 Unauthorized message, and as such a 401 Unauthorized message is sent to the local agent 16 (step 110). Also assume that the client 14 is incapable of processing such a message or providing any type of additional authorization information. As such, the local agent 16 will recognize this incompatibility, and take the necessary steps to properly respond to the authorization challenge.

The local agent 16 may then cooperate with the PCD 12 or application running thereon to request authorization indicia from the user (or other application) via the user interface 40 (step 112) and receive authentication indicia from the user via the user interface 40 (step 114). Based on the received authentication indicia, the local agent 16 will create authentication credentials (step 116) and send a new Modified Register message to the intermediate system 26 to respond to the previously received 401 Unauthorized message (step 118). Again, the intermediate system 26 will respond with a 100 Trying message indicative of it processing the Modified Register message (step 120). Once the intermediate system 26 has processed the new Modified Register message, which would include the authentication credentials created by the local agent 16, a 200 Registration Success message may be sent back to the local agent 16 (step 122). Those skilled in the art will recognize that the local agent 16 could interact with data or some application in the PCD 12, other than the user interface 40 included for illustration, to obtain the authentication indicia or any other desired information.

Notably, the intermediate system 26 may or may not realize that the local agent 16 is in play, and will essentially treat the local agent 16 as the client 14, and thus, the local agent 16 must act as a proxy or liaison therebetween. Upon receiving the 200 Registration Success message from the intermediate system 26, the local agent 16 will send a 200 Registration Success message to the client 14 (step 124) in response to the original Register message sent out by the client 14 (from step 100). The local agent 16 will modify the messaging between the client 14 and another entity, as well as supplement the capabilities of the client 14 by accessing other applications on the PCD 12 or contacting the user via the user interface 40.

Once media sessions are established, the local agent 16 may process both incoming and outgoing media. Thus, when streaming media is sent toward the intermediate system 26 (or remote client 14) (step 126), the streaming media is actually directed to the local agent 16, which will process the outgoing media (step 128) and send the processed streaming media to the intermediate system 26 (or remote client 14) (step 130).

Similarly, streaming media intended for the client 14 from the intermediate system 26 (or the remote client 14) is actually directed to the local agent 16 (step 132), which will process the incoming media (step 134) and send the processed streaming media to the client 14 (step 136). Again, the streaming media, or any other type of media being delivered in the media session, may be processed in any number of ways. The processing most beneficial for streaming media would include characterization, conditioning, reconstruction, error concealment, buffering, changing compression, and converting between different coding and decoding schemes.

Figure 3:
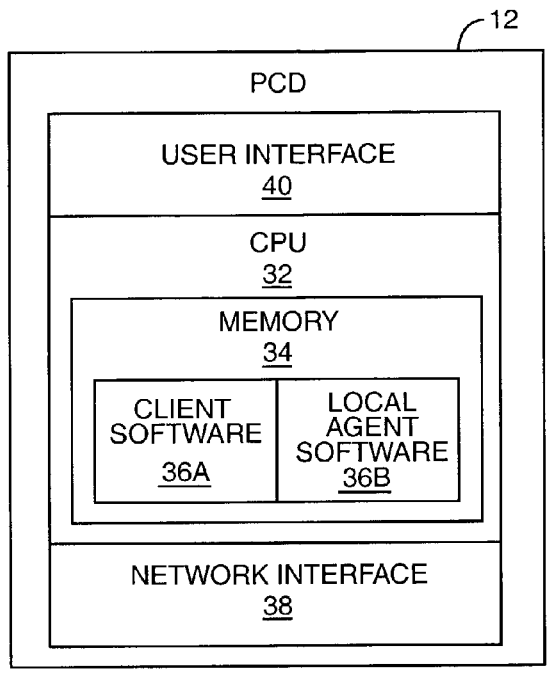
FIG. 3 is a block representation of a personal communication device having integrated local agent capability according to a first embodiment of the present invention.

Turning now to FIG. 3, a block diagram of a PCD 12 is illustrated, wherein the local agent 16 is implemented within the PCD 12. As such, the PCD 12 will include a central processing unit (CPU) 32 having sufficient memory 34 for both the client software application 36A and local agent software application 36B. The CPU 32 will cooperate with a network interface 38 to facilitate packet-switched communications with other devices, and a user interface 40 to facilitate interaction with the user in traditional fashion. The PCD 12 may be any type of computing device, such as a personal computer, personal digital assistant, and the like. In the preferred embodiment, communications between the client software application 36A and the local agent software application 36B occurs via the internal side of the network interface 38 utilizing the addressing scheme commonly know as localhost in the context of Internet Protocol (IP) networking. Those skilled in the art will recognize that the client and local agent software applications 36A, 36B could be implemented in various forms other than a pure software implementation and their intercommunication could be implemented using a variety of mechanisms.

Figure 4:
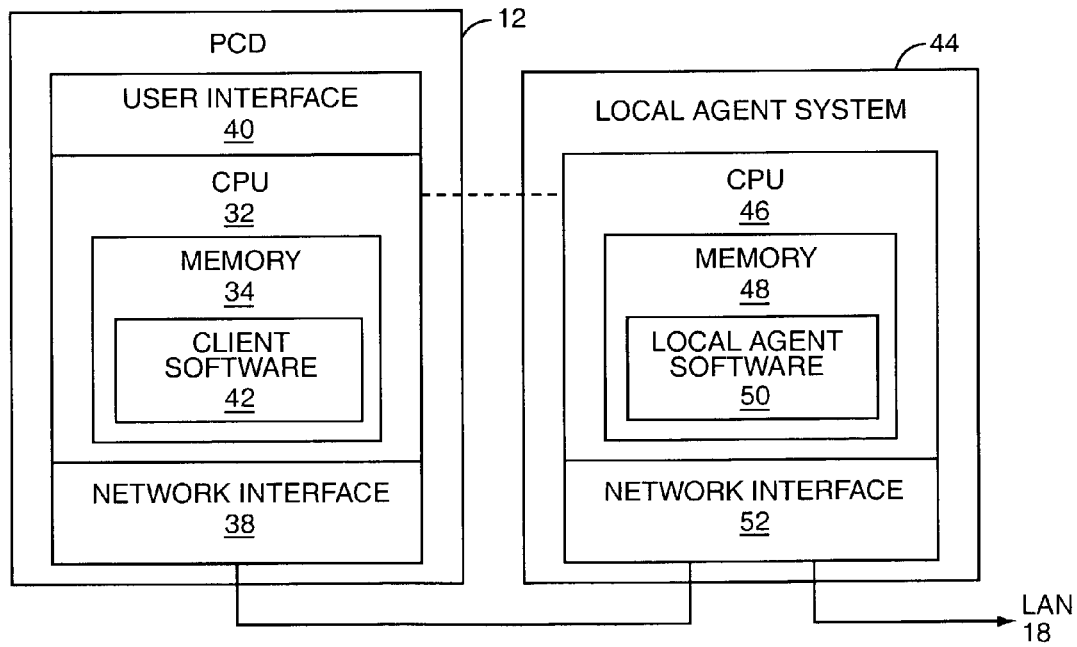
FIG. 4 is a block representation of a personal communication device and an associated local agent system capable of interacting with the personal communication device to provide the local agent functionality according to a second embodiment of the present invention.

FIG. 4 illustrates an environment wherein the local agent 16 is implemented in a separate system. As such, the PCD 12 is configured as described above, with the exception that client software 42 is provided on the PCD 12, and a local agent system 44 is cooperatively associated with the PCD 12. The local agent system 44 also includes a CPU 46 having sufficient memory 48 to provide the local agent software application 50. The local agent system 44 may include a network interface 52 to facilitate interaction with the PCD 12 via its network interface 38, or through any other technique allowing the CPUs 32, 46 to cooperate with one another such that the concepts of the invention described above are facilitated. Those skilled in the art will recognize that interfaces such as Universal Serial Bus (USB) and other common interfaces could potentially be used to facilitate the interaction between the PCD 12 and the local agent system 44. In an exemplary embodiment, the present disclosure contemplates a computer readable medium having software for enhancing communication client capability, the software comprising instructions to provide a local agent operatively associated with a communication client, and operate on behalf of and enable communication functions that the communication client is not capable of providing, wherein the local agent is implemented at an edge of a network on which the communication client resides.

Those skilled in the art will recognize improvements and modifications to the preferred embodiments of the present invention. All such improvements and modifications are considered within the scope of the concepts disclosed herein and the claims that follow.

What is claimed is:

1. A system for enhancing communication client capability comprising a local agent operatively associated with a communication client such that the local agent is operating within a same device as the communication client and configured to operate on behalf of the communication client and enable communication functions that the communication client is not capable of providing by serving as a liaison between the communication client and the remainder of a communication network, wherein the local agent is implemented at an edge of the communication network on which the communication client resides and the local agent is configured to allow compatibility between the communication client and other communication clients by processing both messages and media streams to provide compatibility.

2. The system of claim 1 further comprising a personal communications device comprising a central processing unit and memory cooperating to provide the communication client and the local agent.

3. The system of claim 1 further comprising a central processing unit and memory cooperating to provide the local agent wherein the communication client is provided in a personal communication device operatively associated with the system at the edge of the network.

4. The system of claim 1 wherein the local agent is further configured to interact with an intermediate device through which media sessions must be established to allow the media sessions to be established and maintained with another communication client through the intermediate device.

5. The system of claim 4 wherein the intermediate device is a network address translation device.

6. The system of claim 4 wherein the intermediate device is a firewall.

7. The system of claim 1 wherein the local agent is further configured to process messages to and from the communication client to enable the communication functions that the communication client is not capable of providing.

8. The system of claim 7 wherein the local agent is further configured to change addressing of the messages to enable communications between the communication client and another entity.

9. The system of claim 7 wherein the local agent is further configured to reformat the messages to enable communications between the communication client and another entity.

10. The system of claim 1 wherein the local agent is further configured to process media streams associated with media sessions to and from the communication client to enable the communication functions that the communication client is not capable of providing.

11. The system of claim 10 wherein the local agent is further configured to process the media streams by buffering incoming or outgoing media streams.

12. The system of claim 10 wherein the local agent is further configured to process the media streams by changing a compression associated with incoming or outgoing media streams.

13. The system of claim 10 wherein the local agent is further configured to process the media streams by changing at least one of the group consisting of coding and decoding associated with incoming or outgoing media streams.

14. The system of claim 10 wherein the local agent is further configured to process the media streams by recharacterizing incoming or outgoing media streams.

15. The system of claim 10 wherein the local agent is further configured to process the media streams by conditioning incoming or outgoing media streams.

16. The system of claim 10 wherein the local agent is further configured to process the media streams by reconstructing incoming or outgoing media streams.

17. The system of claim 1 wherein the local agent is further configured to effect interaction with a user of the communication client to gather information necessary to respond to another communication client on behalf of the communication client.

18. The system of claim 1 wherein the local agent is further configured to effect interaction with an application associated with a device on which the communication client is provided to gather information necessary to respond to another communication client on behalf of the communication client.

19. The system of claim 1 wherein the local agent is further configured to implement features the communication client is not capable of providing.

20. The system of claim 1 wherein the local agent is further configured to provide a user interface on a device that provides the communication client.

21. The system of claim 1, wherein the communication client and the local agent combine to form an endpoint at the edge of the network.

22. A method for enhancing communication client capability with a local agent operatively associated with a communication client, the method comprising:
   a) operating the local agent on behalf of the communication client; and
   b) enabling communication functions that the communication client is not capable of providing by serving as a liaison between the communication client and the remainder of a communication network, wherein the local agent operates within a same device as the communication client and is implemented at an edge of the communication network on which the communication client resides and the local agent is configured to allow compatibility between the communication client and other communication clients by processing both messages and media streams to provide compatibility.

23. The method of claim 22 wherein a personal communications device comprises a central processing unit and memory that cooperate to provide the communication client and the local agent.

24. The method of claim 22 wherein a central processing unit and memory cooperate to provide the local agent and the communication client is provided in a personal communication device operatively associated with the central processing unit.

25. The method of claim 22 further comprising interacting with an intermediate device through which media sessions must be established to allow the media sessions to be established and maintained with another communication client through the intermediate device.

26. The method of claim 25 wherein the intermediate device is a network address translation device.

27. The method of claim 25 wherein the intermediate device is a firewall.

28. The method of claim 22 further comprising processing messages to and from the communication client to enable the communication functions that the communication client is not capable of providing.

29. The method of claim 28 further comprising changing addressing of the messages to enable communications between the communication client and another entity.

30. The method of claim 28 further comprising reformatting the messages to enable communications between the communication client and another entity.

31. The method of claim 22 further comprising processing media streams associated with media sessions to and from the communication client to enable the communication functions that the communication client is not capable of providing.

32. The method of claim 31 wherein the local agent is further configured to process the media streams by buffering incoming or outgoing media streams.

33. The method of claim 31 further comprising processing the media streams by changing a compression associated with incoming or outgoing media streams.

34. The method of claim 31 further comprising processing the media streams by changing at least one of the group consisting of coding and decoding associated with incoming or outgoing media streams.

35. The method of claim 31 further comprising processing the media streams by recharacterizing incoming or outgoing media streams.

36. The method of claim 31 further comprising processing the media streams by conditioning incoming or outgoing media streams.

37. The method of claim 31 further comprising processing the media streams by reconstructing incoming or outgoing media streams.

38. The method of claim 22 further comprising interacting with a user of the communication client to gather information necessary to respond to another communication client on behalf of the communication client.

39. The method of claim 22 further comprising interacting with an application associated with a device on which the communication client is provided to gather information necessary to respond to another communication client on behalf of the communication client.

40. The method of claim 22 further comprising implementing features the communication client is not capable of providing.

41. The method of claim 22 further comprising providing a user interface on a device that provides the communication client.

42. A non-transitory computer readable medium encoded with software for enhancing communication client capability, the software comprising instructions to provide a local agent operatively associated with a communication client, and operate on behalf of and enable communication functions that the communication client is not capable of providing by serving as a liaison between the communication client and the remainder of a communication network, wherein the local agent is implemented at an edge of the communication network on which the communication client resides and the local agent is configured to allow compatibility between the communication client and other communication clients by processing both messages and media streams to provide compatibility.

* * * * *